F. A. SAWYER & G. GOODRIDGE.
Improvement in Vegetable-Slicers and Strippers.

No. 131,787. Patented Oct. 1, 1872.

Witnesses:
Frank H. Jordan
F. C. Jordan.

Inventor:
Frederick A. Sawyer
Geo. Goodridge
Per Atty Wm. H. Clifford

UNITED STATES PATENT OFFICE.

FREDERICK A. SAWYER AND GEORGE GOODRIDGE, OF PORTLAND, MAINE.

IMPROVEMENT IN VEGETABLE SLICERS AND STRIPPERS.

Specification forming part of Letters Patent No. 131,787, dated October 1, 1872.

*To all whom it may concern:*

Be it known that we, FREDERICK A. SAWYER and GEORGE GOODRIDGE, both of Portland, in the county of Cumberland and State of Maine, have invented a new and useful Combined Vegetable Slicer and Stripper; and we hereby declare the following to be a full, clear, and exact description of the same, reference being had to the accompanying drawing, which is hereby made a part of this specification, in which—

Figure 1:
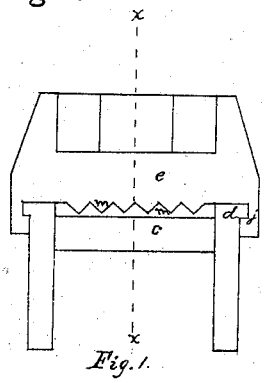
Figure 2:
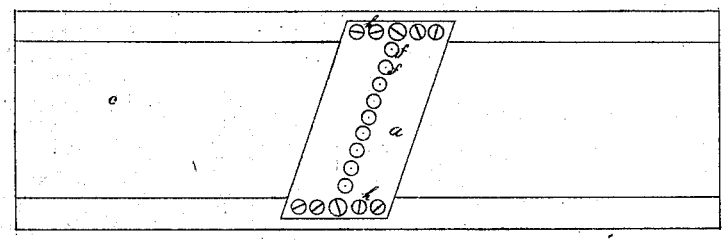
Figure 3:
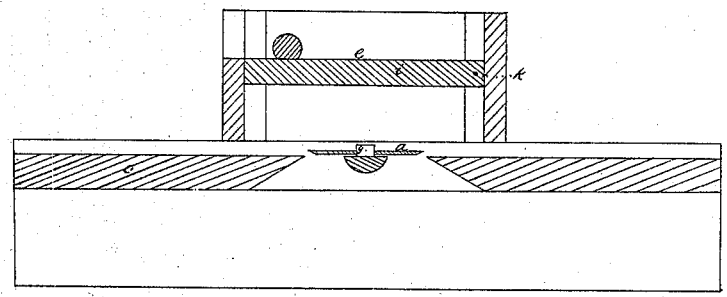
Figure 4:
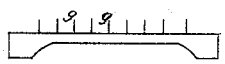

Figure 1 is an end view of our invention; Fig. 2 is a top-plan view of the box, showing the double-cutting diagonal knife a; Fig. 3 is a side sectional elevation of our invention on the line x x, seen in Fig. 1; Fig. 4 is a side view of the stripping-knives; and Fig. 5 is a vertical longitudinal section of our invention.

Same letters show like parts.

The object of our invention is to produce a device by means of which any vegetable, such as potatoes, apples, carrots, &c., may be cut either into thin slices or narrow strips, as may be desired, with great rapidity and regularity. This result is a very desirable one in the manufacture of soups and similar articles of food, as well as when it is desired to cook the vegetables alone.

We are aware of several devices which have been made for cutting vegetables into thin slices, but know of none by means of which they can be cut into strips, as in our device.

To do this we make a box, c, of any desired size, having the edges of the sides d extend a short distance above the top, which forms the bed to contain the cutting devices hereinafter to be described. These projecting edges of the sides are formed into grooves j, in order to constitute a track upon which the slide or carriage e, containing the substance to be sliced or stripped, may run easily backward and forward. At the point in what we have herein denominated the top of the box is an orifice made to contain the knives or cutters, which said knives are placed diagonally to the line of the sides, as shown, so that as the slide or carriage moves toward the cutting-edge the substance which it contains will be more readily cut by the saw-motion which results from this method of presentation, than when the material to be cut is pushed squarely against the cutting-edge. These cutting devices consist, first, of the horizontal double-edged knife, shown at a, Fig. 2, the double edge being provided so that a slice will be cut both in pushing the vegetable forward and backward. Through this flat vertical knife are the perforations f f, through which protrude the narrow-pointed knives g, placed at intervals across the whole length of the knife. These knives are of a sufficient length to cut into the vegetable the thickness of two slices as cut by the knife. The screws h h can be so set that the thickness of the slices may be regulated as desired; or, by another arrangement, all the knives g g may be dropped below the plane of the knife a, and the vegetable only cut in slices instead of in strips, as when the knives g are allowed to come above the plane of the slicing-knife a.

The operation of our device is as follows: The substance to be cut is placed in the receptacle on the top of the slide e, under the cover or door i, and pressed downward. This downward pressure brings the material down upon the knives; then by sliding the carriage e backward and forward the horizontal knife a cuts slices, while, at the same time, and by the same motion, the knives g g cut the slices into strips of a width about equal to their thickness. Then, when slices alone are desired, the knives are dropped downward, the knife a alone acts upon the material.

This device may also be used in slicing bread, cheese, &c., if made of a proper size to receive them.

The grooves m m are cut in the bottom of the slide to allow the passage of the knives g g as the slide goes backward and forward. The slide has also the follower i, hinged at k, under which the vegetable or other substance is placed when about to be cut. This follower, however, can be used equally well, and, perhaps, under some circumstances, better, if not hinged to the frame, as above described.

By the use of another set of knives the material can, with equal facility, be cut into cubes.

What we claim as our invention, and desire to secure by Letters Patent, is—

The diagonal-cutting perforated knife $a$, as arranged with the set-screws $h$, and the perpendicular stripping-knives $g$ $g$, all in the manner and for the purposes set forth—i. e., to form a combined vegetable slicer and stripper.

FREDERICK A. SAWYER.
GEORGE GOODRIDGE.

Witnesses:
D. W. SCRIBNER,
F. E. JORDAN.